United States Patent [19]
Malmin

[11] 3,919,775
[45] Nov. 18, 1975

[54] ENDODONTIC SEALING SYSTEM AND APPARATUS

[76] Inventor: Oscar Malmin, 127 E. Wayne Ave., Akron, Ohio 44301

[22] Filed: June 11, 1973

[21] Appl. No.: 368,480

Related U.S. Application Data

[62] Division of Ser. No. 213,993, Dec. 30, 1971.

[52] U.S. Cl. .................................................. 32/57
[51] Int. Cl.² ......................................... A61C 5/02
[58] Field of Search ..................... 32/58, 57, DIG. 4; 128/24 A, 62, 82.1, 303.1, 399, 400, 401

[56] References Cited
UNITED STATES PATENTS

| | | | |
|---|---|---|---|
| 1,818,627 | 8/1931 | Kerr | 32/51 |
| 2,016,597 | 10/1935 | Drake | 32/58 X |
| 2,814,877 | 12/1957 | Tilden | 32/58 |
| 3,274,995 | 9/1966 | Eidus | 128/399 X |
| 3,593,425 | 7/1971 | Robinson | 32/58 |
| 3,662,755 | 5/1972 | Rautenbach et al. | 128/303.1 |
| 3,703,037 | 11/1972 | Robinson | 32/DIG. 4 |
| 3,809,977 | 5/1974 | Balamuth et al. | 32/58 X |

Primary Examiner—Robert Peshock
Assistant Examiner—J. Q. Lever
Attorney, Agent, or Firm—Freeman & Taylor

[57] ABSTRACT

An endodontic or root canal sealing system and apparatus for practicing the system which includes an instrument for first placing a sealing or cementing substance onto the walls of the primary root canal as well as the auxiliary canals communicating therewith. The system also includes the utilization of gutta percha cones or "plugs" and an instrument for inserting said plugs into the canal following application of the sealing substance. The system also includes the utilization of an instrument either electrical, manual, or ultrasonic to heat, condense and/or pack the gutta percha cones or "plugs" into the main root canal and the auxiliary canals to thereby insure complete filling of a canal system. The system also includes the use of ultrasonically activated tips to place filling material into the cavity preparations or access openings in the crown of the tooth.

7 Claims, 33 Drawing Figures

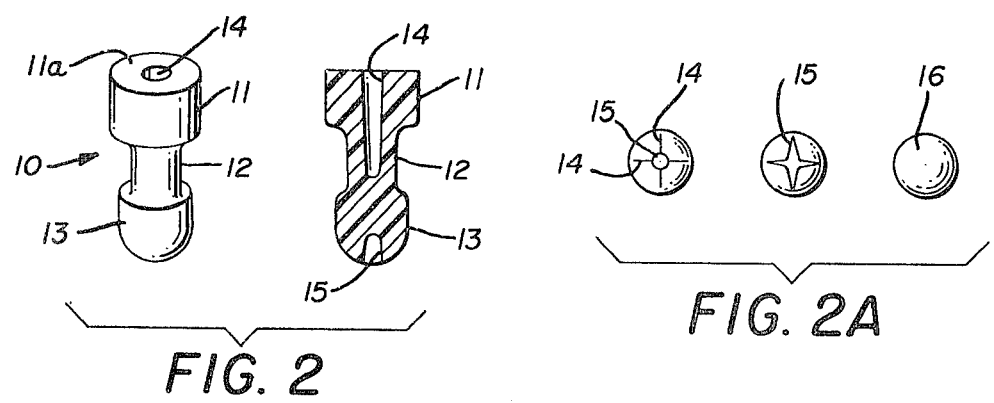
FIG. 2
FIG. 2A
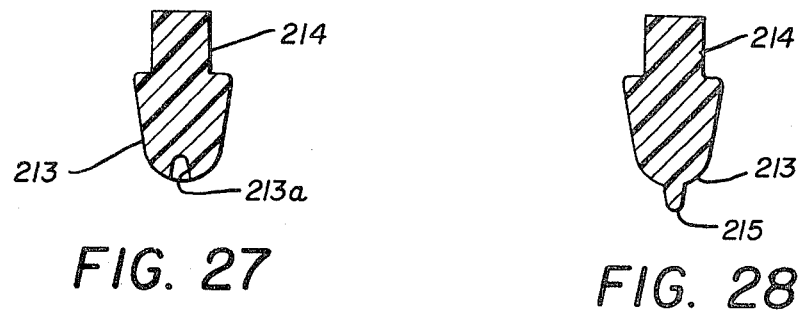
FIG. 27
FIG. 28
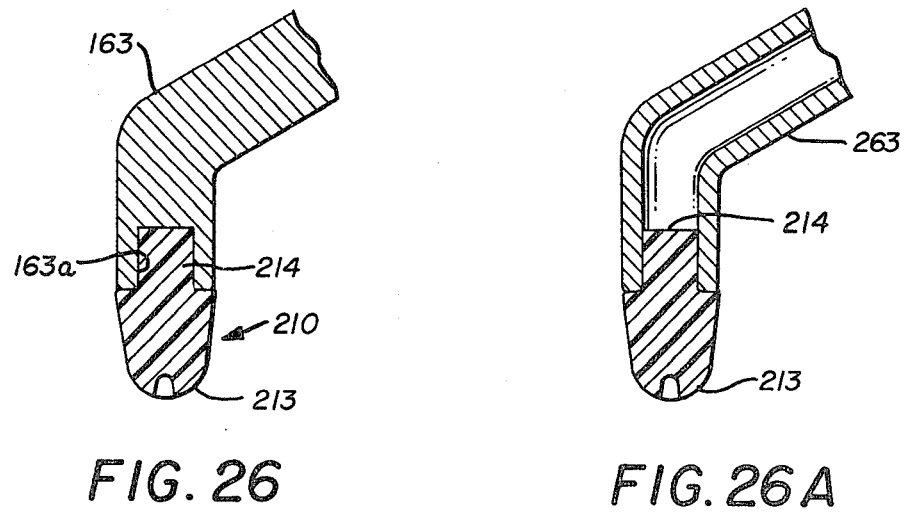
FIG. 26
FIG. 26A

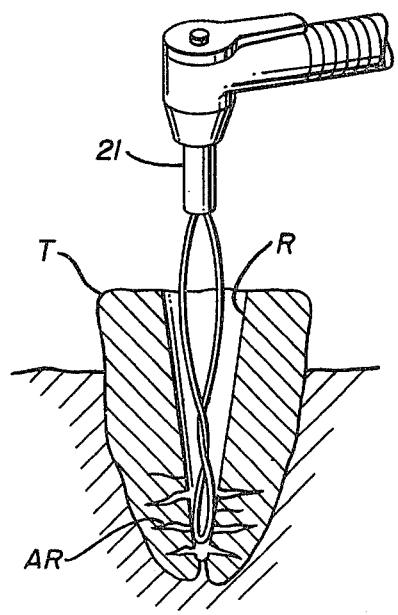
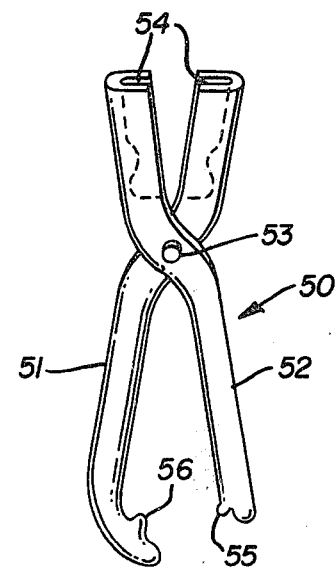
FIG. 5
FIG. 8
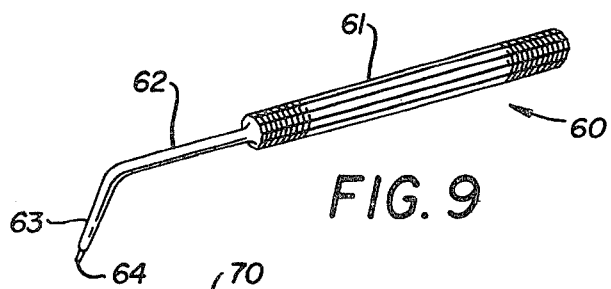
FIG. 9
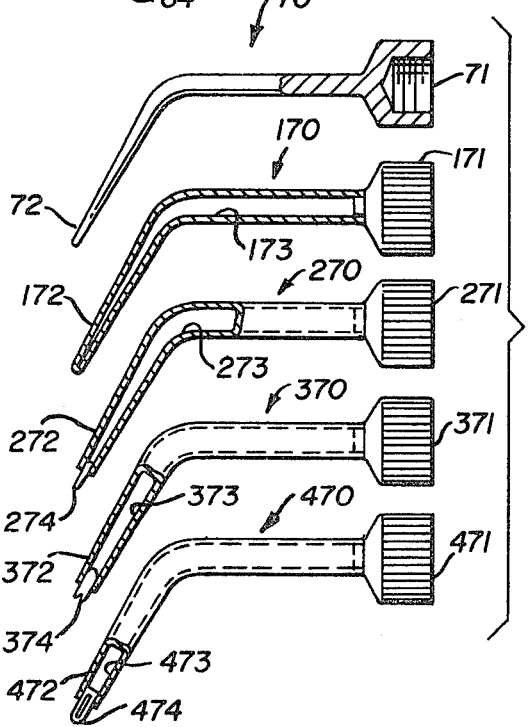
FIG. 10
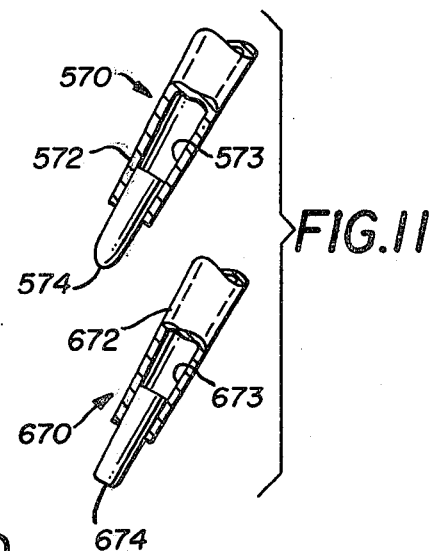
FIG. 11

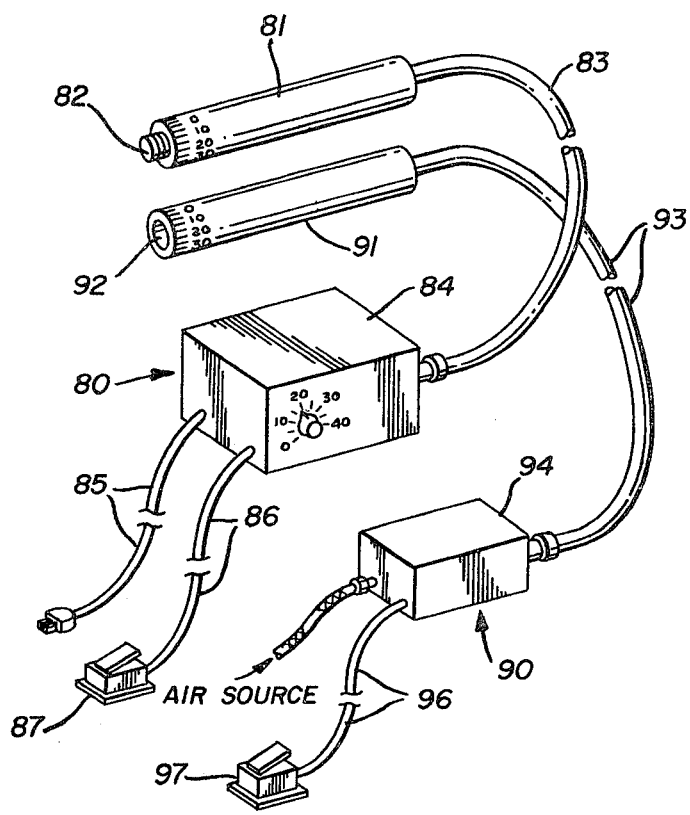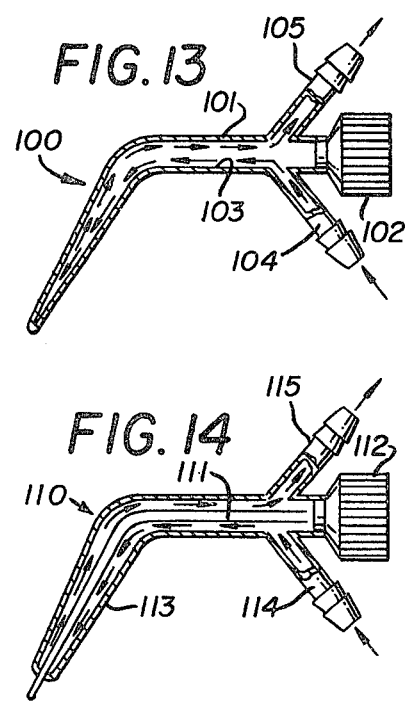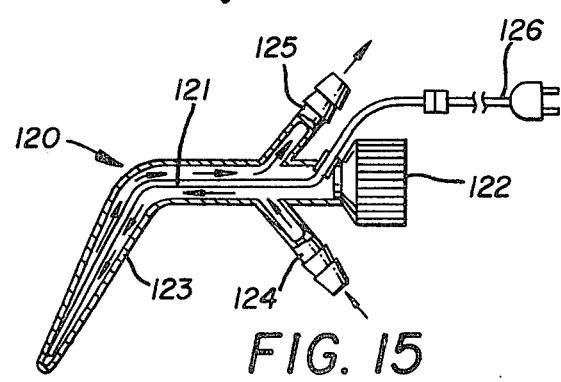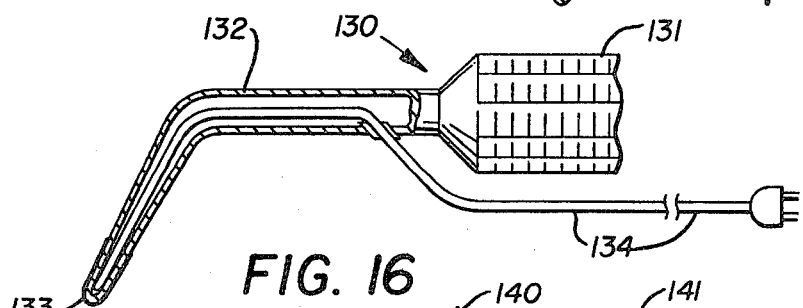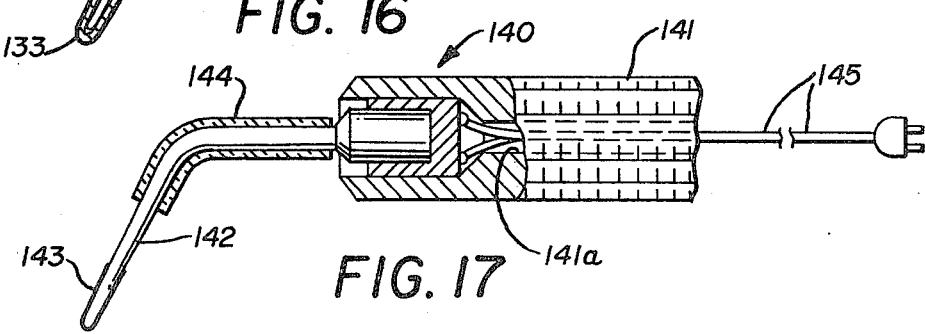

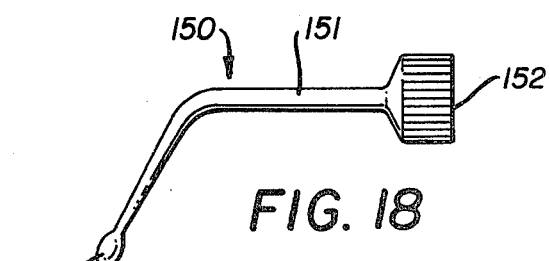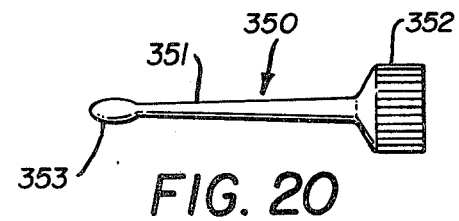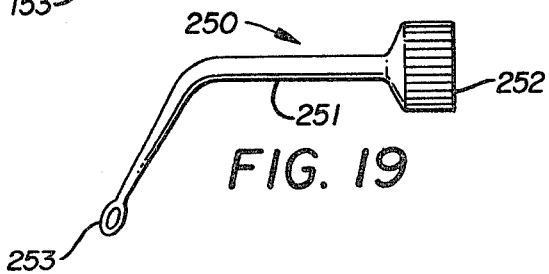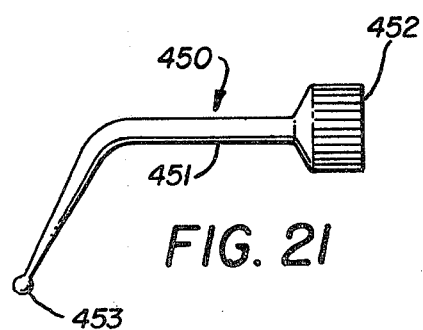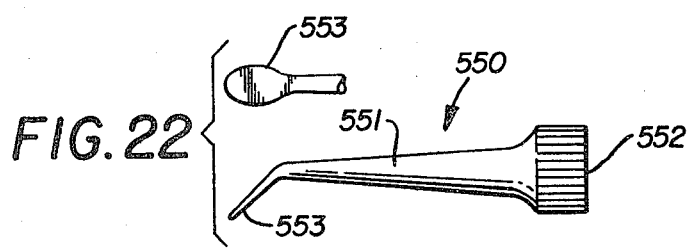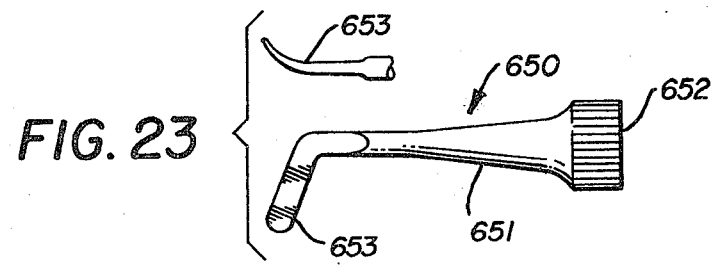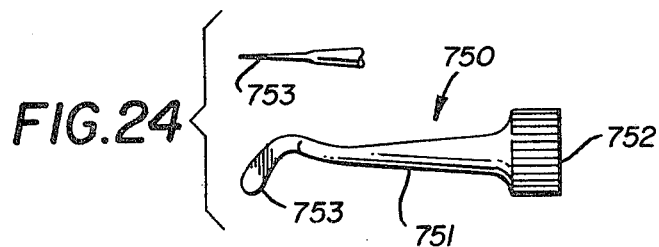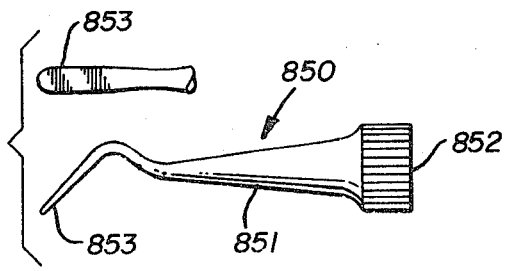

ENDODONTIC SEALING SYSTEM AND APPARATUS

RELATED APPLICATIONS

This is a divisional application of Applicant's earlier filed, co-pending application identified as Ser. No. 213,993 filed Dec. 30, 1971.

BACKGROUND OF THE INVENTION

This invention relates in general to dental treatment and specifically to the field of dentistry called endodontics which deals primarily with root canal therapy. In this regard, the root of the tooth is usually comprised of one major canal and a variable number of accessory or auxiliary canals which communicate with the major root canal and with the supporting tissues surrounding the tooth. In order to obtain a complete and successful therapy on the tooth, it is necessary that both the primary root canal and the auxiliary canals are properly sealed.

The invention specifically relates, therefore, to a system as well as an apparatus for carrying out that system which will accomplish the mechanical aspects of completely sealing the root canal system in a very simple and efficient manner and has for an object such a sealing operation as will encourage the dentist to save the tooth rather than extract it.

DESCRIPTION OF THE PRIOR ART

Applicant is aware of various forms of pluggers or applicators for endodontic sealing work which exist and are presently being used. However, none of these has the capability of completely sealing both the main root canal and the lateral or auxiliary canals with consistency or reliability, and, in addition, are time-consuming, tedious, and relatively inaccurate.

SUMMARY OF THE INVENTION

In order to provide for an overall successful root canal therapy, it is necessary that the canal first be positively cleaned and reamed and irrigated to provide chemical cleansing and dissolution of the protein contents of the root canal system. Both of these objects are believed to be accomplished by the method and apparatus disclosed in Applicant's earlier filed co-pending applications, Ser. No. 151,475 entitled "Root Canal Instrument," now issued U.S. Pat. No. 3,713,221, and Ser. No. 165,923 entitled "Endodontic Operating System."

It has been found that once the root canal has been mechanically and chemically prepared by means, for example, such as are shown in the above-referred to co-pending patent applications, that a further step is necessary to successfully complete the overall root canal therapy.

Specifically it is then necessary to effectively place a cementing and sealing substance into the tooth and not only into the main root canal, but into the auxiliary canals as well to provide a total obturation of the root canal system.

It has been discovered that by providing a unique applicator for a chemical sealing substance, the substance can be inserted into the main root canal and manipulated so that it will be spread to not only cover the walls of the main canal, but find its way to the openings of, or be forced into, the auxiliary canals as well.

It has further been discovered that by employment of uniquely contoured gutta percha cones, a mechanical sealing can also be obtained. In this regard, by the utilization of the uniquely contoured cone and a novel plugger head, the plugs or cones can be inserted into the main canal following which an ultrasonically-activated plugger, for instance, can be utilized to both soften the cones and at the same time condense or compress the substance of which they are made in a cementing action into the passageways of the overall root canal system.

A unique organizer and storage device has also been provided to reduce the operation to the utmost simplicity and efficiency while insuring the optimum of sterilization.

Furthermore, it has been found that the excess gutta percha material from the major canal can be removed by ultrasonically activated instruments having various configurations, all of which, however, have the capability to warm, cut, and remove the unwanted excess material.

Additionally, it has been found that the use of an ultrasonically-activated instrument of varying configurations can be used to more effectively place various anterior filling materials in the access openings or cavity preparations in the anterior teeth.

Accordingly, production of a sealing system and the apparatus therefor of the character described becomes the principal object of this invention, with other objects thereof becoming more apparent upon a reading of the following brief specification, considered and interpreted in view of the accompanying drawings.

OF THE DRAWINGS

FIG. 2 is a combined perspective and sectional view of one form of gutta percha cone.

FIG. 2A is an end view of three different configurations for the cone of FIG. 2.

FIG. 5 is a schematic view showing the utilization of one of the instruments of FIG. 4 in conjunction with the root canal of a tooth.

FIG. 8 is an elevational view of uniquely-formed pliers or forceps for holding the spatula blade of FIG. 7.

FIG. 9 is a perspective view of a manually-operated plugger to be used in conjunction with the cones of FIGS. 2 and 3.

FIGS. 10 and 11 show a plurality of modified plugger tips to be utilized with ultrasonically-operated plugging instruments.

FIG. 12 shows two forms of ultrasonic units to be used in conjunction with the plugging tips shown in FIGS. 10 and 11.

FIGS. 13, 14, and 15 show modified plugging heads or tips employing lubricating or cooling means.

FIGS. 16 and 17 show alternate forms of plugging or tamping instruments containing heating equipment.

FIGS. 18 and 19 show various forms of instruments to be utilized in scraping away excess gutta percha from the main root canal of the tooth.

FIGS. 20, 21, 22, 23, 24, and 25 show some of the various possible forms of instruments used to place cavity filling materials and to close the access openings into teeth.

FIGS. 26 and 26A show modified plug configurations and are elevational views in section.

FIG. 27 and FIG. 28 show still further modified elevational sectional views of various plug configurations.

Figure 29:
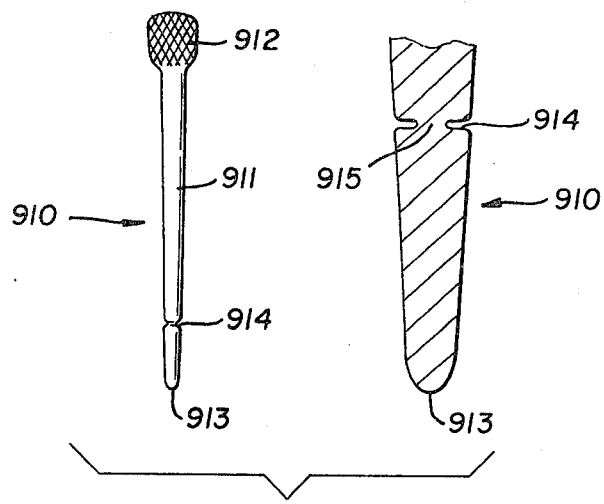

FIG. 29 is a combined elevational and sectional view of still another form of gutta percha cone.

Figure 30:
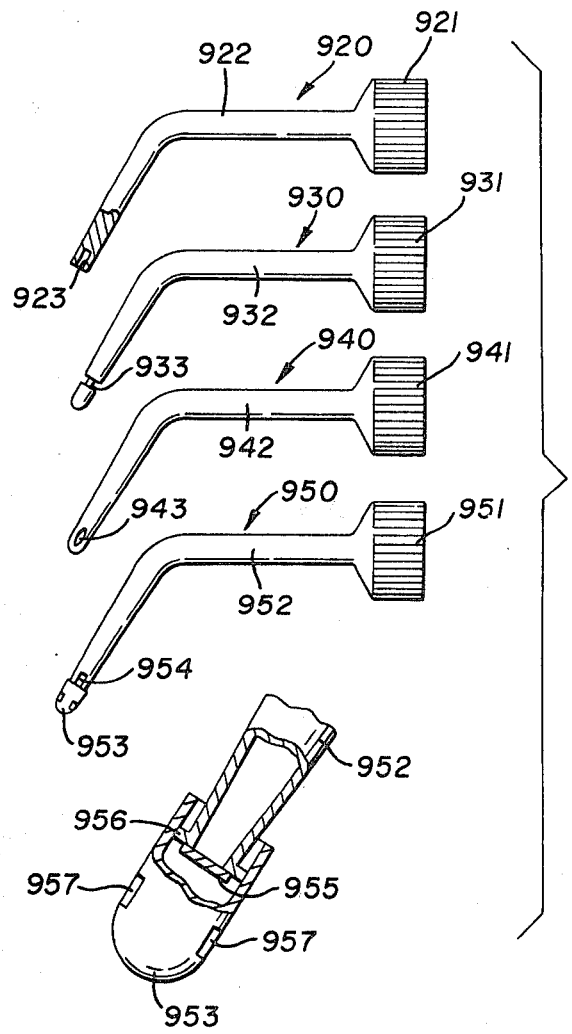

FIG. 30 shows a plurality of modified tips for applying a chemical sealer.

DESCRIPTION OF THE PREFERRED EMBODIMENTS

As noted above, the overall sealing system involves several steps and also involves the utilization of various uniquely-designed instruments. For purposes of clarity the various instruments which are utilized in carrying out the overall sealing system will be described, following which their step-by-step application to the sealing system will be explained.

Considering first FIG. 2, the preferred form of the cone or plug in a deformable or heat-moldable material is generally indicated by the numeral 10 and includes an enlarged top portion 11, a reduced diameter central portion 12, and a further enlarged bottom end portion 13. A central bore 14 extends inwardly and downwardly from the top surface 11a of the enlarged portion 11, and a further cavity or bore 15 extends upwardly from the bottom of the bottom portion 13. In this manner, the well created by the reduced diameter portion 12 between the top 11 and bottom 13 will tend to hold the chemical sealing material and also facilitates condensing through collapsing of the cone, resulting in the generation of lateral pressure as will be described below.

FIG. 2A shows a bottom view of a cone such as is shown in FIG. 2, with the left-hand view showing the blind bore 15 with a plurality of radiating slots 14,14. The middle view in FIG. 2A shows a plurality of intersecting slots 15,15 replacing the bore 15. The right-hand version shown in FIG. 2A simply shows a rounded solid end portion 16, with it being understood that any of these three variations could be utilized.

Figure 3:
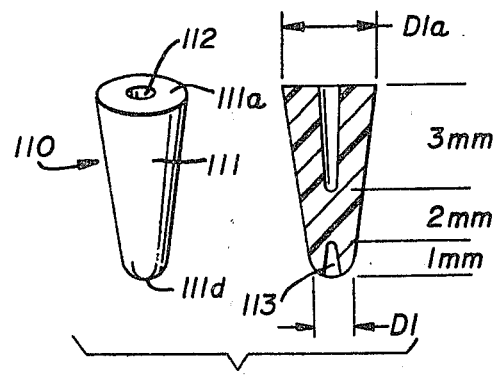
FIG. 3 is a combined perspective and sectional view of another form of gutta percha cone.
Figure 3A:
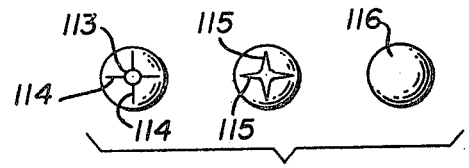
FIG. 3A is an end view of three different configurations for the cones of FIG. 3.

Considering next then FIGS. 3 and 3A, it will be noted that these disclose a modified cone or plug, generally indicated by the numeral 110, made of gutta percha or some similar thermoplastic sealing material. The plug has a body 111 which is cone-shaped in cross section and has a central bore 112 extending from one end to a distance of approximately three millimeters into the body. It should be understood in this regard that the invention is not intended to be limited to any particular precise dimensions, but the dimensions disclosed in FIG. 3 are fairly conventional and accepted in practice.

The bottom end 111d of the cone has a reverse conical bore 113 therein. Modifications, of course, can be employed such as are shown in FIG. 3A. For example, the first form shown in FIG. 3A, which is a bottom view of the cone, shows the bore 113 and a plurality of slots or slits 114,114. This type of configuration permits and facilitates the flowing of the cone when it is placed under pressure as will be subsequently described.

The middle form of the cone shown in FIG. 3A eliminates the bore 113 and exaggerates the slotting or slitting as shown at 115,115. Finally, the right-hand version of the cone shown at 116 simply shows a rounded solid end.

Any of the cones or plugs show in FIGS. 2, 2A, 3, and 3A can be utilized in the overall system, although the preferred system would involve utilization of the cone shown in FIG. 2 sine it is believed that this will obtain the optimum dispersion of the sealing material.

FIGS. 26, 26A, 27, and 28 show still further possible configurations for the plugs.

For example, FIG. 26 shows a plug 210 which has a shank 214 and a rounded or conical end portion 213. Also illustrated in FIG. 26 is an instrument similar to that shown in FIG. 9 with a solid tip 163 that has a reversed bore 163a in the outboard end. It is believed apparent that frictional engagement with the shank of the plug is quite possible with this type of arrangement.

Similarly, FIG. 26A also shows a plug which has a shank 214 and a rounded end 213, with the only difference being that the tip of the instrument 263 is hollow. Again, frictional engagement with the shank is possible.

FIGS. 27 and 28 show further variations of the plugs of FIGS. 26 and 26A, with the plug of FIG. 27, for example, being identical to that of FIG. 26 except for the provision of a blind bore 213a in the rounded end 213. This, of course, would facilitate spreading of the material under pressure as already described.

FIG. 28 shows a similar plug with a shank 214 and a rounded end 213, but this plug has a thin, elongate, finger-like projection 215 at the outboard end. Due to the fact that the root canal narrows toward the apical end, it is contemplated that the projection 215 would readily fit into the apex of the canal thereby completing the sealing.

Figure 4:
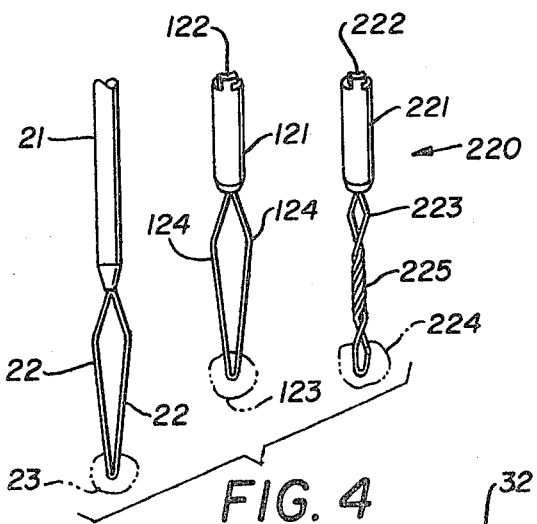
FIG. 4 is a perspective view of three forms of instruments for applying a chemical sealing material to the canal system.

Turning next then to FIG. 4 for a description of the instruments employed for inserting the chemical sealing substance into the tooth, it will be noted that three variations are shown. On the left is a hand-operated instrument with a handle 21 and diverging wires 22,22. The chemical sealing substance 23 is inserted between the wires and held there until the instrument is inserted into the root canal of FIG. 5, for example. Following this, rotation of the handle 21 will cause the material to be spun and centrifugally forced against the walls of the root R of the tooth T as well as being forced into the auxiliary root canals AR of the tooth.

The middle form of the instrument shown in FIG. 4 represents a very similar instrument having a handle 121 and wires 124 which carry the material 123. This form of the instrument, however, has a projecting engagement lug 122 on its handle which permits it to be utilized in conjunction with a power-operated instrument as shown in FIG. 5.

The form of the invention shown on the right of FIG. 4 again shows a handle 221 and wires 223 which holds the material 224. This form is also intended to be power-driven and has the attachment lug 22. In this form of the invention, however, the wires 223 are tightly wound in a spiral configuration as indicated at 225.

Any of the sealing application instruments shown in FIG. 4 also have the advantage that they are readily cleaned and sterilizied for re-use if desired because of their very simple construction. Thus, the loop or the wires would need only to be dipped into some solvent, following which application of power would be made and the instrument would clean itself so that any sealer that might still be on the wires would be removed and the instrument would be ready for re-use.

Figure 7:
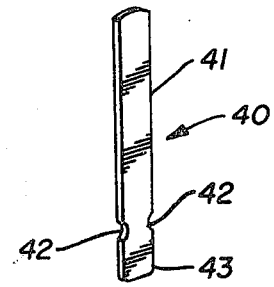
FIG. 7 is a perspective view of a disposable spatula blade which can be utilized to mix the sealing material.
Figure 6:
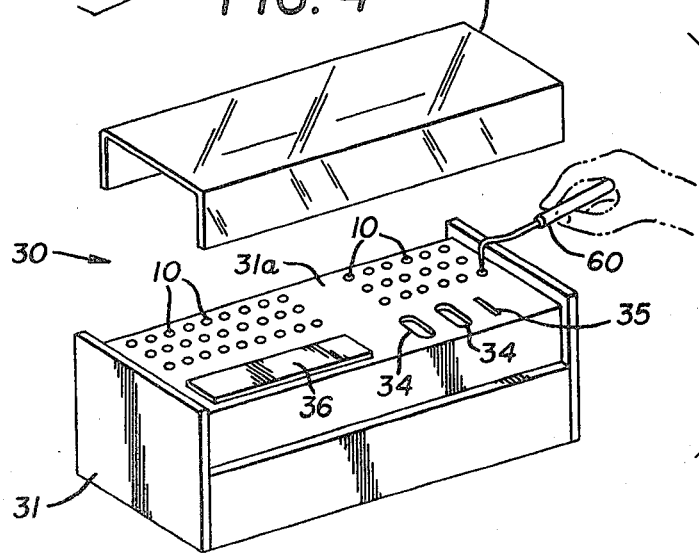
FIG. 6 is a perspective view of the storage and mixing container.

Considering next then FIGS. 6 and 7 for a description of the work organizer and mold base as well as the spatula blade, it will be noted that the work organizer, generally indicated by the numeral 30, includes a base 31 which has a top surface 31a. The top surface 31a has a plurality of holes in it which are intended to receive a plurality of cones 10,10 of the type shown in FIGS. 2, 3, and 3A. These cones may be organized by size, and appropriate size indicia could be placed on top surface 31a adjacent the appropriate holes if desired.

The top surface 31a also contains provision for a form of a mixing surface 36 and several wells 34,34 which provide receptacles for the materials that are mixed together and then used in sealing. A receptacle 35 is also provided for reception of the spatula blade 40, and the entire unit is provided with a clear transparent cover 32 which will effectively close it off for improved cleanliness or sterility.

Considering FIGS. 7 and 8 then, it will be noted that the mixing spatula blade, generally indicated by the numeral 40, is intended to be disposable and simply consists of a thin sheet of metal having a thin, flat mixing surface 41 and a handle portion 43 with notches 42,42 being provided in the opposed side edges thereof. A handle 50 (FIG. 8) is provided in the form of pliers or forceps and has opposed arms 51,52 which are pinned together as at 53 in conventional fashion. One end of each handle, however, has a contoured cutout area 54,54, with the internal contour of this area corresponding to the handle 43 and notches 42,42 of the spatula blade 40. In this fashion the handle 50 can firmly grip the spatula blade 40 to faclitate use of the same in the mixing operation. The opposed end of the arms 51,52 are provided with a notch 55 and an engagement member 56 so that once the spatula blade 40 has been placed in the jaws of the handle 50, it can be locked in place by engaging latch 56 with the notch 55 thereby preventing inadvertent release of the spatula blade.

Turning next then to FIGS. 9 through 11 for a description of the plugging means, it will be noted that FIG. 9 shows a conventional hand-operated tool, generally indicated by the numeral 60, which includes a handle 61 and a projecting, angularly configured working portion 62 which terminates in end 63. The end 63 carries on it a conically-shaped projection 64 which has an appropriate external diameter about the same as the internal diameter of the cone 10 show in FIGS. 2 and 3. In this fashion insertion of the member 64 into the bore 12 of the cone 10 permits it to be readily lifted from the storage member 30 (see FIG. 6) and inserted into the root canal (see FIG. 1).

It is anticipated that a modification of this method could be achieved by making the working portion 62 hollow and the conically-shaped projection 64 a movable shaft with a springloaded or manually activated capability to move the projecting tip 64 into and out of the hollow working portion 62. The advantage of this method would be the ease of disengaging the cone or "plug" from the tip 64 when the cone or "plug" is properly placed.

FIGS. 10 and 11 show modified forms of plugging members which are intended to be utilized in connection with an ultrasonic unit which can be adapted to any one of a number of commonly available ultrasonic dental cleaning units. FIGS. 10 and 11 illustrate only the root canal condensers or pluggers, while FIG. 12 shows various forms of ultrasonic activating devices. Since the ultrasonic activating devices have different means of attaching the working tips, it is anticipated that the principles of the work tips hereinafter described can utilize any such attachment means, with one form being illustrated.

Considering first then FIG. 10, it will be noted that the first form, generally indicated by the numeral 70, has a threaded opening 71 in one end which can be secured, for example, to the actuator 80 shown in FIG. 12. This unit has an angled shank and a conical end 72 which is utilized in substantially the same fashion as is the hand-operated instruments 60. There is no provision, of course, with this type of plugger to provide rapid heating and cooling inasmuch as the shank is solid.

The form of the plugger illustrated by the numeral 170 again has means for attaching it to the ultrasonic activator 171, but this form of the invention is hollow inside as indicated at 173. This type has the advantage of being capable of rapid heating and cooling, and furthermore the transmission of cavitation action is more advantageous to the effective lateral plugging forces necessary to seal the auxiliary canals AR.

The form of the invention shown and indicated by the numeral 270 again has means 271 for attachment to the activation device and again is hollow as indicated at 273. However, the end of the hollow shank is provided with a short solid section which is capable of being formed so as to better fit the bore 12 of the cone 10 and, therefore, upon mechanical action to achieve even more effective condensation and compression.

The form of the invention shown and indicated by the numeral 370 again has means 371 for attachment to the ultrasonic power source and again is hollow, as indicated at 373. Once more also a plug 374 is inserted in the outboard end 372 of the shank, but the end thereof is split. Again the member 374 will fit the bore 12 in the plug 10, and by virtue of its split configuration provide even greater effectiveness in the lateral condensing action desired.

The form of the invention indicated by the numeral 470 is similar to the forms already described except that a hollow point 474 is utilized at the condensing end of the plugger for the purpose of achieving increased effectiveness in the rapid heating/rapid cooling principle.

FIG. 11 shows still further modifications. Thus in the top illustration a plugging member 574 is provided which has a bullet-nosed or elliptical form which would tend to provide additional lateral distribution of the condensing forces at least in the initial obturation of the apical areas of the root canal.

The form shown at the bottom of FIG. 11 has a blunt-nosed cone 674 which would be of particular applicability in filling the greater part of the canal, especially in the coronal half of the root canal system which requires mainly downward thrust as contrasted to the lateral thrust desired in the apical area.

It should be noted here that all of the forms of plugging instruments shown in FIG. 10 disclose a threaded head, such as 71, 171, etc. It is to be understood that this type of head is employed when the ultrasonic device, such as illustrated in FIG. 12 and indicated by the numeral 80, is employed. By the same token, of course, depending upon the type of ultrasonic power actuator being employed, this could be an insert form in which event the enlarged threaded head 71 would simply be replaced by an insert plug (not shown) so as, for example, to be capable of being press fit in an ultrasonic actuator such as indicated by the numeral 90 in FIG. 12.

Referring next then to FIG. 12, it will be noted that two forms of ultrasonic activating devices are illustrated. Applicant is aware of the fact that there are others commercially available and that these are used for illustration purposes only to show what the plugging units 10 and 11 are secured to.

Thus, the form generally indicated by the numeral 80 includes a hand-held instrument 81 with a projecting threaded lug 82. This is connected by means of a cable 83 to an electrical source using a generator and transducer 84 which is, in turn, connected to a wall outlet by means of the cord 85 and which is operated by means of the foot pedal 87.

The form shown and generally indicated by the numeral 90 also includes a hand piece 91 and a bore 92 in one end thereof. This merely represents another way of attaching the pluggers to the handle. In this form also the hand piece is connected to the air source modified either through a fluidic control center 94 or by means of an air turbine camming or resonation means in the handpiece itself and is again operated by means of the foot pecal 97.

The ultrasonic devices 80 and 90 of FIG. 12 have been illustrated pretty much schematically inasmuch as they are of basically conventional construction and are readily available commercially, and application of these handpieces to the instruments involved in this application are believed to be well within the skill of one normally skilled in this art.

Considering next then FIGS. 13, 14, and 15, it will be noted that in the utilization of certain types of ultrasonic dental devices, it has been found that no heat is produced in the scaling tip and, therefore, provision must be made to heat or cool the plugger point for instance. Thus, in FIG. 13 a plugger generally indicated by the numeral 100 is illustrated as having a shank 101 which is hollow as indicated at 103. A conduit or inlet tube 104 leads to a source of heating or cooling fluid (not shown). This fluid is forced into the interior of the plugger and exists through the outlet tube 105. This permits rapid heating and cooling of the tip.

FIG. 14 shows a modification of this concept in which a solid condensing point or plugger 111 similar to that shown and indicated by the numeral 70 in FIG. 10 is employed with a cooling and/or heating jacket 113 placed around it. Once more the heating or cooling fluid is introduced through the tube 114 and exhausted through the tube 115.

Finally FIG. 15 illustrates a plugger for use on an ultrasonically activated device in which the solid plugger 121 is completely encased in a jacket 123. The solid plugger 121 is in reality an internal heating element which will conduct low voltage electricity and is connected to a power source 126. In this form of the invention the cooling would again occur, of course, by introducing cooling fluid in through the tube 124 and out through the tube 125.

In all three of these instruments (FIGS. 13, 14, and 15), no detail has been illustrated with regard to the means of introducing the fluid since it is believed this is well known to anyone skilled in the art.

FIGS. 16 and 17 show application of the principles of the invention to hand instruments. Thus FIG. 16 discloses a hand instrument 130 with a handle 131 and a plugging shank 132. An electrical source is introduced into the interior of the shank 132 as indicated at 134, and thus heat is generated internally. It has also been found that by coating the tip of the shank 132 with material such as for example Teflon, as shown at 133, that adherence of the softened gutta percha to the tip is prohibited or minimized.

FIG. 17 shows another form of a hand-operated instrument in which the handle 141 carries the heating "pot" or element with which the shank 142 seats and makes connection with the electrical source 145. This shank also has a Teflon coating 143 on its end and is connected to an electrical or heat source by means of the cord 145. In this particular device, however, a safety sleeve 144 is provided, preferably of plastic, and is primarily intended to protect the lips of the patient.

As mentioned above and as will be described again below in describing the steps of performing the sealing operation, a plurality of cones 10,10 would, of course, be successively inserted into the tooth. It is often the case that as the build-up of the gutta percha in the root canal continues and approaches the coronal end of the tooth, it is desirable to remove the excess gutta percha from the tooth. FIGS. 18 through 25 disclose a plurality of forms of tips which can be again attached to the ultrasonic power sources such as are illustrated in FIG. 12. These tips take various configurations, and each of them has certain advantages.

Thus FIG. 18 discloses a tip 150 with a shank 151 and has a spoon-like enlarged end 153.

The tip 250 of FIG. 19 again has a shank 251, but this has a loop in its outboard end, as indicated at 253. Both of these are particularly advantageous for removing excess gutta percha from the main root canal. The tips shown in FIGS. 20 through 25 show various forms for restoration or filling of cavities especially with the new plastic or silicate filling materials in the coronal portion of the tooth, and the forms may vary depending upon the angles and shapes desired.

Thus, the tip 350 consists of a flat blade-like tip 353, while the tip 450 has a circular end 453 (see FIGS. 20 and 21).

FIGS. 22 and 23 show various configurations of tips 553 and 653, while FIGS. 24 and 25 show still further modified tips 753 and 853. While certain forms of tips have been illustrated, this is not to indicate any specific forms, but rather to indicate that any clinically feasible form could be used.

All of these tips may have either a curved shank such as, for example, 151 and 251, or a straight shank such as, for example, 351. These tips can be, as mentioned above, utilized in conjunction with the ultrasonic activating means which will permit them to warm the gutta percha and remove the excess. Preferably also the tips would be coated by a material such as, for example, Teflon which would resist adherence of the gutta percha or other filling material thereto. The particular configuration employed would be a matter of choice to the individual dentist depending upon the particular configuration of the tooth and his particular objectives in finally forming the outer surface of the repaired tooth.

Having now described all of the various apparatus necessary to carry out the therapy in accordance with the system which is the subject of this invention, a step-by-step analysis of the operation is believed in order.

Accordingly then it will first be assumed that the root canal has been both mechanically and chemically prepared in accordance with the teachings of Applicant's earlier referred to co-pending applications, for example.

Following this, the spatula handle 40 and the pliers 50 are engaged, and a suitable mixture of chemical sealing material is prepared on the mixing area 36 of the storage unit 30.

One of the instruments of FIG. 4 is then employed to pick up the desired amount of the material, following which the instrument and the sealing material are inserted into the root canal of the tooth as shown in FIG. 5. Rotation of either of the instruments 20, 120, or 220 will result in the chemical sealing compound being not only forced against the walls of the main root canal R (FIG. 1), but against and possibly into the auxiliary canals AR.

Figure 1:
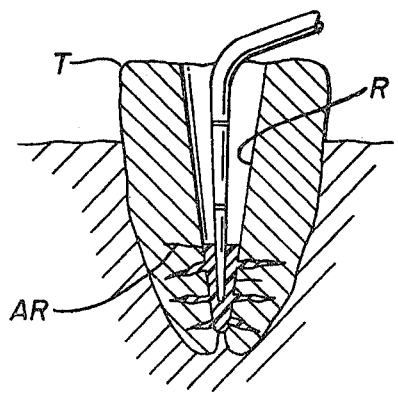
FIG. 1 is a sectional view showing the root canal system of a tooth together with a cone and an inserting or plugging instrument.

Following this, the instrument is removed, and either the hand instrument 60 of FIG. 9 or one of the instruments shown in FIGS. 10, 11, 12, 13, 14, 15, 16, or 17 is employed. The projecting end of the instrument is inserted into the cavity 12 of a suitable cone 10, and the cone is then placed into the root canal as shown in FIG. 1. Activation of either the ultrasonic units or the hand-operated units is then achieved, which has the result of providing heating, compressive and condensing forces on the cone. The cone, of course, becomes almost plastic in nature and flows into the auxiliary root canals AR as well as being firmly compressed and distributed about the walls of the main root canal R.

Subsequently, of course, additional plugs 10 would be inserted into the main canal R until the gutta percha builds up to the coronal area of the tooth. At this time the final operation of sealing all openings or cavities can be performed with the tips shown in FIGS. 18 through 25.

Referring next then to FIG. 29, a still further form of cone for utilization in conjunction with the basic principle of this invention is shown. Specifically, a conventional onepiece tapered gutta percha plug 910 is shown having a shank 911, a gripping surface 912, and a rounded bottom tip 913. This cone is provided, however, with an annular notch 914 which results in the tip 913 and the rest of the body being connected by only a thin reduced diameter piece of material 915. In use of a cone of this type as contrasted to the types shown in FIGS. 2 and 3, it is merely necessary to insert the cone into the apical region of the root canal, following which the gripping portion 912 can be grasped between the fingers and rotated until such time as the plug snaps and breaks into two pieces at the reduced diameter portion 915. This leaves the desired end portion of the cone in position where it could be further condensed and packed into place by the methods described above.

Turning next then to FIG. 30, it will be noted that in FIG. 4 a variety of instruments for applying the chemical sealing substance to the walls of the root canal were illustrated. These devices were intended to be utilized either by hand manipulation or through a rotary action. The tips shown in FIG. 30, however, are designed to apply the chemical sealant using the same principle but activating the applicator by means of an ultrasonic handpiece. For example, the tip 920 has means for attaching it to the handpiece, generally indicated at 921, and includes a shank 922 with a blind bore 923 in the outboard end thereof. The sealing material can be placed in this, following which activation of the handpiece will distribute the sealer into the canal system.

The tip 930 also, of course, has a shank 932 and an attachment end 931, but this tip has an annular groove 933 in its outboard end. The sealing material, of course, is placed into the groove, following which the device is activated by the handpiece to distribute it into the canal system.

The tip 940 again has the shank 942 and attachment means 941 and has a through opening 943 in the outboard end. Once more the sealing material is carried therein, and upon activation of the tip by the handpiece, the sealing material will be effectively distributed.

The tip 950 has again the shank 952 and attachment means 951 and is essentially a split shank as shown at 954. The bottom ends of the shank have projections 956 and a cover plate 955. In this form of the invention, however, a disposable cap 953 is utilized and is press-fit onto the end of the shank 952. This tip is hollow and has a plurality of windows or openings 957,957 therein. In operation of this form of the invention the interior of the tip 953 is filled with the sealing material, and upon activation of the tip 950, this material is forced out of the interior of the tip 953 and spread into the canal system as described above.

In all of the forms of the invention shown in FIG. 30, any ultrasonic handpiece such as, for example, those shown in FIG. 12 can be utilized.

It has been shown, therefore, how a complete root canal sealing system and the apparatus for operating that system have been produced in which a relatively simple operation is required but which has the advantage of sealing not only the main root canal, which may or may not be fairly well sealed under present methods, but also sealing the auxiliary root canal system, which is not routinely well sealed using present commonly accepted methods and instrumetation.

While a full and complete description of the invention has been set forth in accordance with the dictates of the Patent Statutes, it should be understood that modifications can be resorted to without departing from the spirit hereof or the scope of the appended claims.

Thus, while two forms of ultrasonic power sources have been illustrated, for example, it is known that several are commercially available and any are believed to be acceptable for utilization with the unique pluggers shown and illustrated in this application.

Similarly, while dimensions are illustrated in connection with the cone, for example, it should be understood that the application is not intended to be limited to any particular dimensions.

Furthermore, while certain materials have been mentioned in the specification, these are mentioned for illustrative purposes only, and it is believed apparent that other materials having the necessary characteristics can also be employed.

Additionally, while certain forms of instrument tips have been shown, it should be understood that other forms or configurations could be used limited only by the natural anatomic obstacles or individual operator preference.

It should also be noted that while the blind bore, such as indicated at 14 in FIG. 2, and the plug have been shown having a circular configuration, it is possible to provide the base of the plug with a V-shaped indentation or bore. This would enable the plug to be utilized with a conventional dental spreader which is provided with a V-shaped point. This, of course, would enable the overall system to be utilized without having to provide a newly designed instrument.

What is claimed is:

1. A plugging instrument adapted to apply a sealing plug to a root canal for use with an ultrasonic dental instrument and with a source for supplying heating and cooling fluid, comprising;
   A. an elongate angular shank having first and second end;
   B. attachment means on said first end of said shank
      1. whereby said plugging instrument may be releasably attached to said ultrasonic dental instrument;
   C. the second end of said shank having a generally elongate tapering conical configuration; and
   D. said shank being hollow and carrying attachment means for connection to said source of heating and cooling fluid whereby said fluid may be circulated interiorly of said shank.

2. The instrument of claim 1 wherein said shank is hollow and carries attachment means for connection to said source of heating and cooling fluid whereby said fluid may be circulated interiorly of said shank.

3. An endodontic instrument for placing compressible sealing plugs having blind bores in one end thereof in root canals, comprising;
   A. an elongate handle; and
   B. a curved shank having a reduced diameter and projecting from one end of said handle with
      1. an elongate engagement portion at its outboard end having a further reduced diameter
      2. said reduced diameter engagement portion being dimensioned to fit within and engage said blind bore of said plug.

4. A plugging instrument for applying a compressible sealing plug to a root canal, comprising:
   A. an elongate, angular, hollow shank having first and second ends;
   B. a handle secured to said first end; and
   C. heating means for heating said shank carried within said hollow shank; and
   D. said second end having a reduced diameter portion adapted to engage said plug.

5. A plugging instrument for applying a sealing plug to a root canal, comprising;
   A. an elongate, angular solid shank having first and second ends;
   B. a handle secured to said first end of said shank and containing a heating element;
   C. said second end of said shank having a conical configuration adapted to engage said plug; and
   D. a covering enclosing said shank from said first end thereof to a point short of said second end thereof and insulating the portion of said shank covered thereby.

6. A plugging iunstrument for applying a sealing plug in a root canal in conjunction with an ultrasonic dental scaling device, comprising;
   A. an elongate, hollow shank having first and second ends;
   B. attachment means carried by said first end for releasable engagement with said ultrasonic device; and
   C. said shank carrying a solid core;
   D. means for selectively heating said core; and
   E. means for selectively circulating cooling fluids about said core interiorly of said shank.

7. A plugging instrument for applying a compressible sealing plug to a root canal in conjunction with an ultrasonic dental instrument, comprising;
   A. an elongate, hollow, angular shank having first and second ends;
   B. attachment means carried by said first end for engagement with said ultrasonic instrument;
   C. means carried by said shank for alternatively heating and cooling said shank; and
   D. said second end of said shank being adapted to engage said plug.

* * * * *